United States Patent Office 3,822,343
Patented July 2, 1974

3,822,343
PHARMACEUTICAL TABLET
Stuart Anthony Hill, Worthing, Edwin Herbert Searle, Goring-by-Sea, and Barbara Jean Lister, Worthing, England, assignors to Beecham Group Limited, Middlesex, England
No Drawing. Filed Apr. 16, 1971, Ser. No. 134,874
Claims priority, application Great Britain, Apr. 25, 1970, 19,963/70
Int. Cl. A61k 27/12; A61j 3/10
U.S. Cl. 424—22
10 Claims

ABSTRACT OF THE DISCLOSURE

A sustained release haematinic tablet is produced which comprises a porous matrix resin which is a sandarac resin or a copal resin, having interconnected ducts and pores, and a haematinic subtance packed or contained in or dispersed throughout the ducts or pores.

---

This invention relates to a haematinic composition and more particularly to a haematinic composition which releases the active substituents into the body over an extended period of time.

At present there are many so called "sustained release" medicinal formulations available and many different general methods for the presentation of a therapeutic agent in sustained release form have been reported. In one formulation the therapeutic agent is packed into the interconnected ducts and pores of a synthetic resin skeleton. The synthetic resin employed is insoluble in fluids of the gastrointestinal tract and hence in the tract, the therapeutic agent is gradually leached from the pores of the resin skeleton over an extended period of time, the empty resin skeleton being ultimately excreted from the body.

While this type of formulation has in general proved fairly satisfactory, for certain high dosage drugs it has also proved difficult to produce a sustained release tablet having acceptable weight. The ratio of drug to resin has been a crucial factor in the sustained release properties of the finished tablet, and it has on occasion proved impossible to present a sufficient quantity of the drug without being forced to use an unacceptable weight of resin. Difficulties have also been encountered in the method used to prepare the tablet and in the choice of a suitable resin which can be worked easily and yet has acceptable storage properties. In addition, in the case of a drug having a high degree of solubility, it has proved necessary to use very large quantities of resin in order to retard the release rate of the drug.

British Patent Specification No. 1,153,324 describes another type of sustained release tablet which utilises the natural resin shellac as a carrier medium for the active ingredient. Although the specification does not go into details of the mechanism of release, presumably it is by simple leaching of the active agents from the resin matrix, over an extended period. Shellac is not entirely satisfactory for this purpose, however, since it is known that the release properties of tablets in which shellac is employed as an enteric coating change with time, and the availability of drugs from such tablets may become seriously impaired. This effect is particularly marked when the tablets are stored at elevated temperatures such as those experienced in tropical regions. We have found that this "ageing" effect is also noticeable in sustained release formulations in which shellac is employed as the resin matrix.

According to the present invention, there is provided a sustained release haematinic tablet comprising an available haematinic substance contained predominantly in the inter-connected ducts and pores of a solid, coherent natural resin skeleton, said natural skeleton being of sandarac resin or one or more copal resins.

The haematinic substance may be any one of the ferrous iron salts used in clinical practice for the oral treatment of iron deficiency. Such salts include ferrous sulphate, ferrous gluconate, ferrous succinate, ferrous carbonate, ferrous fumarate and ferrous ascorbate. A preferred ferrous salt is ferrous sulphate.

The sustained release tablet of this invention may, if desired, have one or more outer coatings, of materials such as, for example, sugar.

If desired, other ingredients such as further mineral supplements, may be included.

Sandarac resin, also known as Gum Juniper, is a resin obtained by incision of the tree *Tetraclinus articulata*.

The term "copal resins" refers to a large number of varnish resins of vegetable origin. Some are obtained from living trees, some are fossil resins, and in general they are classifiied according to their geographical origins. Particularly useful resins for use in the present invention are those known as "Manila copals" and these resins are commercially available in several hardness grades.

Manila copals are derived from the species Araucariaceae, of which *Agathis alba* is a typical example. The present trees are found over a very extensive area, covering the Philippines, New Guinea, Borneo, Malaya, Celebes and Moluccas. The softer grades are obtained by tapping, but the hard grades are semi-fossil or fossil copals. The soft grades include the Macassar, Phillippine and Singapore Manilas and the hard grades include Boea and Pontionak.

Other copal resins are: Congo copals, Kauri copal, Sierra Leone copal, Benguela copal, Zanzibar copal, Madagascar copal, Angola copal. A blend of Manila copal resins suitable for use in the present invention is available commercially as "sandarac substitute."

The present invention also includes a process for the preparation of a sustained release haematinic tablet, which process comprises mixing a finely divided haematinic substance with a solution of a natural resin or resins, selected from the sandarac and copal resins, granulating the resulting mixture, evaporating the solvent from the thus produced granules and subsequently compressing the granules into tablet form.

If desired, the tablets may contain a conventional tablet diluent such as lactose, but in general such diluents will be desirable only when low dosages of the heamatinic are required.

The compression step may be assisted by the addition of a tablet lubricant, the granules prior to compression. Suitable lubricants include magnesium stearate, stearic acid, talc or other such commonly used lubricants. A preferred lubricating agent is magnesium stearate. In general, tablets will be dried before compression, and generally prior to the addition of the lubricant.

Suitable solvents for the sandarac or copal resin include alcohols such as isopropyl alcohol or ethyl alcohol.

The tablets which are produced by the process of this invention have a porous matrix of resin having inter-connected ducts and pores, the haematinic substance being packed or contained in or dispersed throughout the ducts or pores. Optionally, the tablet may be given a coating, for example, of sugar, by known coating techniques.

The natural sandarac and copal resins are substantially insoluble in the fluids of the gastro intestinal tract, the haematinic being made available by being leached out from the resin matrix by the digestive juices.

The weight ratio of resin to haematinic substance may vary within fairly wide limits, but generally we have found that it is advantageous that it is in order of from 2–20% weight of resin, based on the total weight of the formulation, the range 5–10% being particularly preferred. The actual ratio chosen will depend upon the desired rate of release.

In a preferred embodiment of the present invention, the haematinic tablets contain between 85 and 95% of dried ferrous sulphate, 1-3% of lubricating agent, and 5-15% of sandarac or copal resin.

In a particularly preferred embodiment of the present invention the haematinic tablets contain 89.8% by weight of dried ferrous sulphate, 1.7% by weight of magnesium stearate, and 8.5% by weight of Manila copal.

The invention will now be illustrated with reference to the following specific examples wherein all parts and percentages are by weight.

EXAMPLE 1

Tablets were prepared to the following formula:

| | Percent |
|---|---|
| Dried ferrous sulphate B.P. | 89.8 |
| Manila copal ("Sandarac substitute") | 8.5 |
| Magnesium stearate B.P. | 1.7 |

The Manila copal was added to about five times its weight of isopropanol, warming to 50° C. to 60° C. and stirring continuously. When the resin was dissolved, the solution was filtered and cooled to room temperature. The ferrous sulphate and half the total quantity of magnesium stearate were placed in a planetary mixer and half the resin solution added evenly with continuous mixing until a heavy granulation was obtained. The granulated material was placed on trays and oven-dried at a temperature not exceeding 45° C. The dried material was passed through an 8 mesh screen. The granules were returned to the mixer, and the remainder of the resin solution added mixing continuously until a light granulation was obtained. The granulated material was spread on trays and oven-dried as before. The dried material was passed through an 8 mesh screen and then through a comminuting mill. The milled granules were mixed with the remainder of the magnesium stearate until evenly blended and compressed into tablets, each containing 130 mg. of iron, in conventional manner.

The release of iron from the tablets when tested in a laboratory apparatus simulating the conditions in the gastro intestinal tract was:
42% of the total in 1 hour
82% of the total in 5 hours

EXAMPLE 2

In this example, the formula and preparative process were identical to those of Example 1, but sandarac resin was substituted for Manila copal. The release of iron from these tablets in the laboratory apparatus was:
43% in 1 hour
84% in 5 hours.

EXAMPLE 3

The comparison purposes tablets with the following composition:

| | Percent |
|---|---|
| Dried ferrous sulphate B.P. | 86.7 |
| Lemon shellac | 10.6 |
| Magnesium stearate B.P. | 2.7 | were prepared by the same method as in Example 1. These tablets released 37% of their iron content in one hour when agitated in 0.6% v./v. hydrochloric acid B.P. at 37° C. After storage for one month at 50°, the tablets released only 22% of their iron content in one hour.

A comparable formula in which Manila copal ("sandarac substitute") was substituted for shellac released 37% of the iron content in one hour initially, but after storage for one month at 50° C., the percentage release was still 33%.

EXAMPLES 4-6

Using the method described in Example 1, tablets of the following formulae were prepared:

| Example 4: | Percent |
|---|---|
| Ferrous carbonate | 86 |
| Manila copal ("Sandarac substitute") | 9 |
| Magnesium stearate | 5 |
| Example 5: | |
| Ferrous succinate | 91 |
| Sandarac | 6 |
| Magnesium stearate | 3 |
| Example 6: | |
| Ferrous femarate | 90 |
| Manila copal ("Sandarac substitute") | 7 |
| Magnesium stearate | 3 |

What we claim is:

1. A sustained release haematinic tablet which consists essentially of 97 to 99% based on the total weight of the tablet of a porous matrix of compressed granules of between 85 and 95% of finely-divided haematinic ferrous salts admixed with 5 to 15% of resin selected from the group consisting of a sandarac resin and a copal resin, said tablet inherently having inter-connected ducts and pores between said compressed granules and 1 to 3% based on the total weight of the tablet of a lubricating agent.

2. A sustained release haematinic tablet according to claim 1 containing from 5-10% of resin, based on the total weight of the tablet.

3. A sustained release haematinic tablet according to claim 1 wherein the ferrous salt is ferrous sulphate.

4. A sustained release haematinic tablet according to claim 1 which has a coating which is soluble or disintegrable in fluids of the gastro-intestinal tract.

5. A sustained release haematinic tablet according to claim 1 wherein the ferrous salt is ferrous sulphate, ferrous gluconate, ferrous succinate, ferrous carbonate, ferrous fumarate, or ferrous ascorbate.

6. A haematinic tablet according to claim 1 which comprises 89.8% by weight ferrous sulphate, 8.5% by weight Manila copal and 1.7% by weight magnesium stearate.

7. A haematinic tablet according to claim 1 which comprises 89.8% by weight ferrous sulphate, 8.5% by weight sandarac and 1.7% by weight magnesium stearate.

8. A sustained release haematinic tablet according to claim 1 which comprises 86% by weight ferrous carbonate, 9% by weight Manila copal, and 5% by weight magnesium.

9. A sustained release haematinic tablet according to claim 1 which comprises 91% by weight ferrous succinate, 6% by weight sandarac resin, and 3% by weight magnesium stearate.

10. A sustained release haematinic tablet according to claim 1 which comprises 90% by weight ferrous fumarate, 7% by weight Manila copal, and 3% by weight magnesium stearate.

References Cited

UNITED STATES PATENTS

| 3,449,489 | 6/1969 | Gaunt | 424—31 |
| 3,317,394 | 5/1967 | Fryklof et al. | 424—22 |
| 2,987,445 | 6/1961 | Levesque | 424—22 |

FOREIGN PATENTS

| 1,153,324 | 5/1969 | Great Britain. |

SHEP K. ROSE, Primary Examiner

U.S. Cl. X.R.

424—19, 34, 147, 295